United States Patent
Sokola et al.

[11] Patent Number: 5,379,011
[45] Date of Patent: * Jan. 3, 1995

[54] SURFACE MOUNT CERAMIC FILTER DUPLEXER HAVING REDUCED INPUT/OUTPUT COUPLING AND ADJUSTABLE HIGH-SIDE TRANSMISSION ZEROES

[75] Inventors: Raymond L. Sokola, Albuquerque, N. Mex.; Joseph P. Krause, Wheaton, Ill.

[73] Assignee: Motorola, Inc., Schaumburg, Ill.

[*] Notice: The portion of the term of this patent subsequent to Sep. 8, 2009 has been disclaimed.

[21] Appl. No.: 965,468

[22] Filed: Oct. 23, 1992

[51] Int. Cl.6 .............. H01P 1/202; H01P 1/205; H04B 1/50
[52] U.S. Cl. ........................ 333/206; 333/134; 455/78
[58] Field of Search ........... 333/202, 206, 207, 222, 333/134, 219; 455/78; 370/24, 30, 32

[56] References Cited

U.S. PATENT DOCUMENTS

| 4,431,977 | 2/1984 | Sokola et al. | 333/202 X |
| 4,464,640 | 8/1984 | Nishikawa et al. | 333/206 X |
| 4,673,902 | 6/1987 | Takeda et al. | 333/206 X |
| 4,733,208 | 3/1988 | Ishikawa et al. | 333/202 |
| 4,742,562 | 5/1988 | Kommrusch | 333/202 X |
| 5,146,193 | 9/1992 | Sokola | 333/206 |
| 5,208,566 | 5/1993 | Kenoun et al. | 333/206 |

FOREIGN PATENT DOCUMENTS

| 0043904 | 2/1987 | Japan | 333/202 |
| 0041301 | 2/1989 | Japan | 333/202 |
| 0060301 | 2/1990 | Japan | 333/202 |
| 0252201 | 11/1991 | Japan | 333/206 |
| 0030601 | 2/1992 | Japan | 333/202 |

Primary Examiner—Seungsook Ham
Attorney, Agent, or Firm—Gary J. Cunnigham; Joseph P. Krause

[57] ABSTRACT

A ceramic bandpass filter (10) with improved input-/output isolation can be surface mounted. Input/output pads (18 and 2) through which electrical signals pass are located on one surface of a block of dielectric material (12) to permit use of the so-called surface mount manufacturing techniques. Slots in the sides of the block that preferably run between the input-output pads can reduce coupling between the input/output pads and permit adjustment of high-side transmission zeroes by changing the dimensions of the slots. No wired connections to the ceramic bandpass filter block are required.

32 Claims, 1 Drawing Sheet

SURFACE MOUNT CERAMIC FILTER DUPLEXER HAVING REDUCED INPUT/OUTPUT COUPLING AND ADJUSTABLE HIGH-SIDE TRANSMISSION ZEROES

FIELD OF THE INVENTION

The present invention relates generally to electrical filters, and relates particularly to so-called ceramic filters.

BACKGROUND OF THE INVENTION

Ceramic filters are well known in the art and at least one is described in U.S. Pat. No. 4,431,977 for a "Ceramic Bandpass Filter". Prior art ceramic bandpass filters are at least partially constructed from blocks of ceramic material, are relatively large and are typically coupled to other electronic circuitry through discrete wires, cables, and pins attached or coupled to connection points on external surfaces of the blocks.

It is also well known that some major objectives in electronic designs are reduced physical size, increased reliability, improved manufacturability and reduced manufacturing cost. To achieve these somewhat conflicting objectives, electronic circuits are increasingly being manufactured using so-called surface-mount techniques. Surface-mount is a manufacturing technique by which electronic components are attached to a circuitry substrate or circuit board without using metallic leads that extend from a package or electronic component. Small connection nodes on typically only one side of a greatly reduced size package, are electrically joined to corresponding connection nodes on a substrate or circuit board by either a wave soldering or reflow soldering technique. The registration, or alignment, of the connection nodes on the component with the connection nodes on the circuit board or substrate must be carefully maintained during assembly. Eliminating connection leads on electronic components and using surface mount techniques permits great reductions in the physical size of an electronic circuit and a significant increase in its reliability by reducing a significant source of electrical failures.

A prior art surface mount ceramic filter is shown in U.S. Pat. No. 5,146,193 to Sokola. While the surface mount ceramic filter shown in this patent addresses the short comings of its prior art, the filter shown in this patent as well as other ceramic filter patents might benefit from still other improvements. Such other improvements would include improved isolation of the input-/output pads from each other and the ability to adjust or control the location of transmission zeroes. A block filter that improves I/O isolation, overall frequency response, and permits adjustment of transmission zeroes would be an improvement over the prior art.

DETAILED DESCRIPTION OF A PREFERRED EMBODIMENT

There is disclosed a ceramic filter incorporating a passband and one or more transmission zeroes the preferred embodiment of which is constructed of a rectangular block of dielectric ceramic material, preferably in the shape; of a parallelepiped. With the exception of one external surface of the ceramic block (the top surface) through which two included through-holes extend, and, with the exception of a portion of one other side or lateral surface of the block upon which connection nodes are located, all external surfaces of the block filter, including surfaces of the block within the through holes are coated with a conductive material (metallized). The metallized external surfaces of the block and the metallized internal surfaces of the through holes, which have a predetermined length, form transmission lines shorted at one end.

In the preferred embodiment, these shorted transmission lines have an electrical length substantially equal to one (or an odd-number multiple of) quarter the wavelength of an electrical signal of a particular frequency that is desired to pass through the filter. The input-output pads are located within an unmetallized area on one lateral side of the block and are pads or areas of conductive material capacitively coupling to the metallized through-hole surfaces. Of particular significance is the addition of at least one slot formed into the side of the block on which the input-output pads are located. The addition of a slot or slots, especially when they are located between the input-output pads, improves the performance of the filter in at least two ways. Coupling between the input-output pads is reduce,:1 by virtue of the slot, which if is not metallized (filled with metallization) creates an air gap between the input-output pads. This air gap has a reduced dielectric constant and provides the increased isolation. If the slot is metallized (filled with the metallization covering the block) the metallization provides a ground plane between the input-output pads coupling stray signals between the pads to ground.

Figure 1:
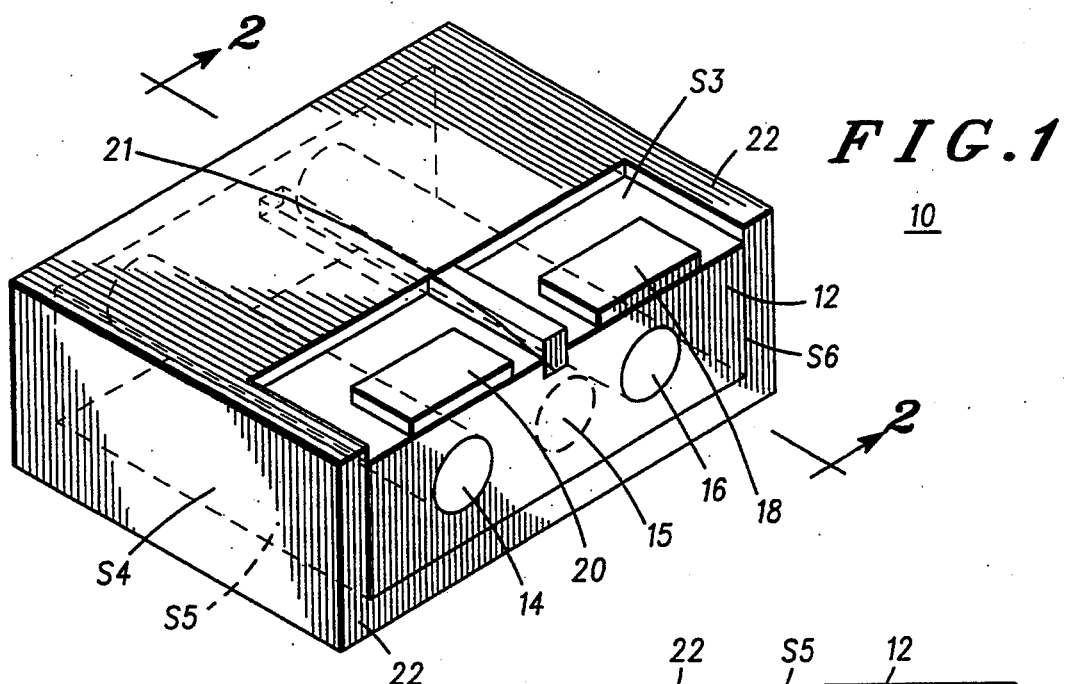
FIG. 1 shows an isometric perspective view of a surface mountable ceramic bandpass filter.

FIG. 1, shows an isometric view of a surface mountable dielectric filter (10). (What appears in FIG. 1 as the top or upper surface of the filter is actually the bottom or lower side (S3) of the block to more clearly show features of this side.) The ceramic bandpass filter (10) shown in FIG. 1 is comprised of a block of dielectric material (12), (shown an cross-section in FIG. 2) having a length L, the external surfaces of which (except for two surfaces) are entirely coated with an electrically conductive material (22).

The block (12) shown in FIG. 1 includes two through holes (14 and 16) that are void cylindrical volumes through the block of material (12). The holes (14 and 16) extend through a first or top surface (shown as S1 in FIG. 2), through the block of material (12) and through a second or bottom surface (S2 shown in FIG. 2). The block (12) in FIG. 1 includes at least one slot (21) formed into the block on the side (S3) on which the input-output pads (18 and 20) are located. The slot, which is shown in FIG. 1 as having a substantially rectangular cross section but which might also be elliptical, preferably extends between the top and bottom surfaces of the block (S1 and S2 respectively) and is substantially parallel to the holes (14 and 16). In FIG. 1, this slot is shown as being filled with the metallization material (22) that coats the exterior surfaces of the block. The optimal dimensions of the depth and width of the slot will be determined by the desired response of the filter. Alternate embodiments of the invention would of course include a slot that is not filled with metallization but is instead devoid of any material. Such an unfilled slot would provide an increased dielectric between the input-output pads by virtue of the higher dielectric constant of air, which would fill the slot.

Figure 2:
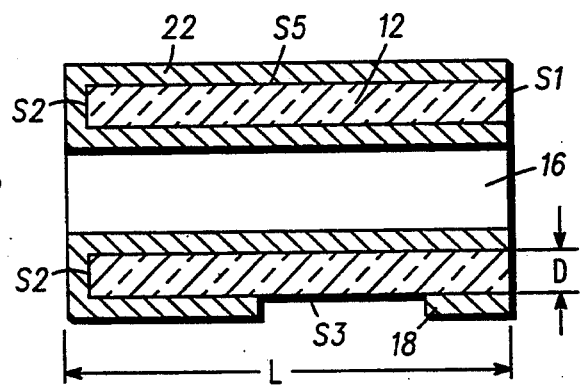
FIG. 2 shows a cross-sectional view along lines 2—2 shown in FIG. 1.

In the preferred embodiment, the external surfaces (S1-S6) of the dielectric block (12) and the slot (21), with the exception of the top surface S1 and a portion of the side surface surrounding the input-output pads (14 and 16), are coated with a conductive material (22). Additionally, the internal surfaces of the block within the through holes (14 and 16) are also coated with conductive material (22). (The coverage of the metallization on the surfaces of the block can be seen in better detail in FIG. 2. FIG. 2 shows that the conductive material, (22) which is also on the internal surfaces of the through holes, extends completely through one end of the holes (the end near side S2) and is electrically continuous with the plating material on the external surfaces of the block 12.) The metallization coating the side surface on which the input-output pads are located is itself a planar surface after its curing.

The block of material (12) comprising the filter (10) has a predetermined physical length, L, which in the preferred embodiment was substantially equal to one-quarter the wavelength of the desired nominal or center pass-band frequency of the filter. Alternate embodiments of the invention could use blocks whose physical lengths are equal to odd-numbered multiples of the wavelength of the desired nominal or center passband frequency of the filter. The holes (14 and 16) shown in the figures can be considered to have longitudinal axes (running the length of the holes) at their geometric centers that are substantially perpendicular (orthogonal) to geometric planes in which the first and second ends (S1 and S2) can be considered to lie. When the through holes are perpendicular to the first and second ends, (S1 and S2) the through holes will of course have a physical length substantially equal to L, the length of the block. The physical length of the hole (L) will of course affect the electrical length of a transmission line formed by the metallization of the surfaces of the holes. (FIG. 1 shows an additional third hole, 15 in broken lines. This third hole, as well as any number of additional holes could be added to the filter.)

The plated through holes (14 and 16), the plating of which at the unmetallized first end (the S1 end) is open circuited and which at the second end (the S2 end) is electrically connected to the metallization on the remaining sides of the block, electrically form transmission lines short circuited (to the metallization on the external surfaces of the block (12)) at their S2 ends and open circuited at their S1 ends. These shorted transmission lines, when properly used as band pass filter elements, will pass to the band pass filter output, only those electrical signals input to the filter that have quarter wavelengths substantially equal to the electrical length of the shorted transmission lines. Signals coupled into the shorted transmission lines the quarter-wavelengths of which are substantially different than the electrical length of the shorted transmission lines will be attenuated. Alternatively, if the electrical length of the shorted transmission lines is substantially equal to an odd number of quarter-wavelengths of signals input to the filter (10), the filter (10) will pass these signals substantially unattenuated as well.

Electrical signals are coupled into and out of the shorted transmission lines through the input output connection pads or connection nodes (18 and 20) shown in FIG. 1. These connection pads (18 and 20) are typically relatively small areas of conductive material, deposited on one side of the block of material (12) in an unmetallized region on the bottom surface (S3) that are used to surface mount the filter (10) to a circuit board or other substrate. By their positions relative to the holes (14 and 16) as seen in FIG. 1, these connection pads (18 and 20) which are also referred to as input output pads, can be considered to be adjacent to the holes (14 and 16). One pad, 18 for instance, might be considered to be adjacent hole 16 whereas the other pad, 20, might be considered adjacent to hole 14.

In the preferred embodiment of a two-pole filter, which is as shown in FIG. 1, the relative position of the input output pads (18 and 20) with respect to the first surface (S1) and geometric center axes of the through holes (14 and 16) is substantially as shown. Capacitive coupling between the input output pads (18 and 20) and the transmission lines, formed by the metallized surfaces of the through holes (14 and 16), is determined at least in part by the dielectric constant of the ceramic material comprising the block (12), the area of the input output pads (18 and 20), and the separation distance (D) between the through holes (14 and 16) and the input-/output pads (18 and 20). (The separation distance (D) between the input/output pads (18 and 20) and the through holes is established by the thickness of the ceramic material between the through holes (14 and 16) and the input/output pads (18 and 20).)

Electrical characteristics of the bandpass filter (10) shown in FIG. 1, (as well as electrical characteristics of the alternate embodiments of the filter discussed herein), including for example center, or resonant frequency, input and output impedance, and bandwidth are established in large part by physical dimensions of the block (12). Resonant frequency is largely established by the length, L, of the block (12), as well as the length of the metallization within the through holes (14 and 16) (Metallization may not extend completely through the entire length of the holes, effectively shortening the electrical length of the transmission line). Input and output impedances are established by the diameters of the through holes (14 and 16), distance from the through hole to the side S3 and dimensions and placement of the input-output pads (18 and 20). Bandwidth of the filter (10) can be altered by changing the distance between the transmission lines, as well as altering the cross-section of the holes and or the metallization on the external sides of the filter.

The filter (10) shown in FIG. 1 described above has a frequency response with at least one transmission zero at a frequency $F_z$ produced by the cancellation of the electric and magnetic fields associated with the two transmission lines. Since in the embodiment shown in FIG. 1 there is very little top loading of the resonators, the frequency at which the electric and magnetic field couplings cancel will occur very close to the passband. This frequency $F_z$ is also controlled by varying the pattern of conductive material on the input/output side of the block as well as the geometry of the block and the resonator holes. Poles, which in the embodiment shown are typically above the frequency of the zero, ($F_z$) are established in part by reducing the effective electrical length of the transmission lines which is accomplished by removing conductive material from the metallization of the block in the areas surrounding the input-output pads. (The metallization removed from side S3 surrounding the input-output pads.) Removing this material decreases capacitive loading on the transmission lines, increasing the resonant frequency of the transmission lines ($F_0$) above the frequency, ($F_z$) at which the electric and magnetic fields cancel.

Figure 3:
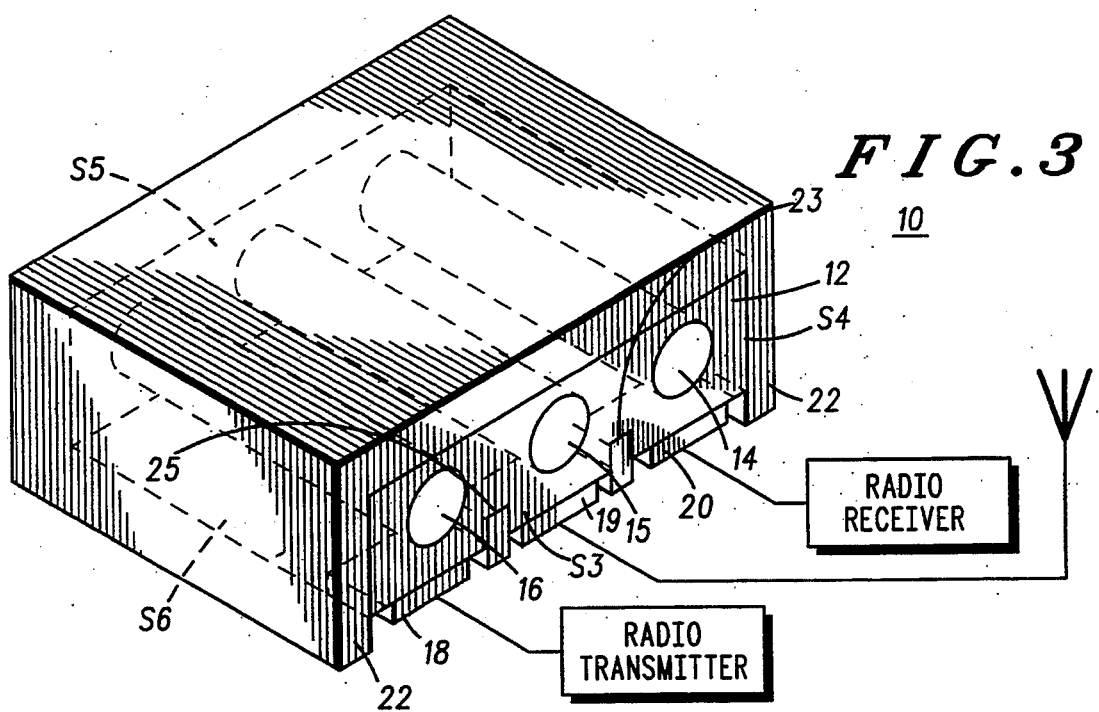
FIG. 3 shows an isometric perspective view of an alternate embodiment of the filter of FIG. 1 used as a duplexer.

The zeroes in the transfer function of the block filters' shown in FIGS. 1 and 3 can be adjusted by the location and dimensions of slots in the side of the block. Moreover, the absence or presence of metallization filling the slots can also affect the location of these zeroes.

In the preferred embodiment of the filter (10) the block of material (12) was a ceramic compound having a relatively high Q factor. This dielectric material might be selected from any high Q microwave ceramics, including families of materials such as barium oxide, titanium oxide, and zirconium oxide. The material is typically pressed to form a block with included holes, fired at a high temperature, and then plated with a conductive material. The plating used on the block (12) may be any appropriate conductive material such as copper or silver. All six sides of the dielectric block material (12) are metallized with the exception of the top or upper surface S1 and a portion of the side surface S3. The unmetallized portion of the side surface S3 substantially surrounds the input/output pads (18 and 20).

While the preferred embodiment of the invention is substantially as shown in FIG. 1, wherein the shape of the dielectric block is a parallelpiped, other embodiments of a surface mountable dielectric block filter might include a substantially cylindrical block of material through which through holes extend and which includes a single flattened side where the input/output pads (18 and 20) may be located. Still other embodiments might contemplate blocks having hexagonal or triangular cross-sectional shapes. Any of these alternate shapes of the block (12) might have different electrical characteristics.

Similarly, the through holes (14 and 16) while shown in the figures as having substantially circular cross-sectional shapes, alternate embodiments of the invention might contemplate plated through holes (14 and 16) that have other cross-sectional shapes, shapes other than circular cross-sections.

Other embodiments of a band pass filter contemplated herein would include ceramic blocks having more than two holes and more than one transmission zero. Such alternate embodiments would include ceramic blocks (12) with possibly three or more internally metallized holes (14, 15, and 16 as shown in FIG. 3), each constructed substantially as described above. (Each metallized hole would comprise a short-circuited coaxial resonator.) A block filter having more than two holes would likely have the two input-output pads described above adjacent to the first and last holes, although the input-output pads might be placed adjacent to virtually any two holes in the block. Still other embodiments of block filters with more than two holes would also include using more than just two input-output pads. Three or more input-output pads might be placed in an unmetallized area of a side of the block to which electrical connections could be made.

FIG. 3 shows a block filter (10) with three resonators (shorted transmission lines) (14, 15, and 16) with three input-output pads (18, 19, and 20) that could also be used as a duplexer for a radio communications device if the third input output pad (19) is properly positioned as a common input-output connection for two filters (each filter comprised of at least two of the three shorted-coaxial transmission lines) sharing the third input-output pad as a common input output connection. Such a duplexer could be used to separate and/or combine electrical signals by frequency.

Referring to FIG. 3, a third input-output pad (19) is shown located between the first and second input-output pads, adjacent (proximate or close) to a third resonator (15) and substantially adjacent to the top surface (S1). (FIG. 3 shows the block filter as seen from the top side, S5.) In the block filter shown in FIG. 3, the first input-output pad (18) and third input-output pad (19) couple signals substantially through the first and third resonators (16 and 15 respectively) that together comprise a first bandpass filter in the ceramic block shown in FIG. 3. The second input-output pad (20) and third input-output pad (19) couple electrical signals substantially through tile second and third resonators (14 and 15 respectively) that together comprise a second bandpass filter in the ceramic block shown in FIG. 3. These first and second bandpass filters shown in FIG. 3 do act as bandpass filters but also share a common input-output terminal, input-output pad 19. In most duplexer applications, these two bandpass filters will usually have different center frequencies each for passing only those signals having frequencies at or near their respective center frequencies.

In the duplexer shown in FIG. 3 there is at least one slot (23 and 25) between each of the input-output pads (18, 19, and 20). These slots, which are shown in FIG. 3 as being filled with metallization, could alternatively be unmetallized, as described above, to provide an air gap between the input-output pads; instead of a ground plane. (The metallization filling the slots would provide a ground plane as long as the metallization filling the slots is electrically coupled to the rest of the metallization coating the block.) As described above, the slots between the input-output pads decrease signal coupling between the input-output pads such that less signal is capacitively coupled directly between the pads and instead inserted into the filter.

Referring to FIG. 3, when operating as a duplexer, if radio frequency signals are impressed on the third input-output pad (19) and if the first and second filters have different center frequencies, the first and second bandpass filters will pass to the first and second input-output pads, (14 and 18) respectively, only those radio frequency signals on pad 19 having center frequencies substantially equal to the center frequencies of the filters. In such an application, the duplexer shown in FIG. 3 can split a signal on the third input-output pad (19) into at least two different frequency components, the components of which appear at either the first input-output pad (18) or the second input output pad (20). A radio frequency signal on pad 19 to be split into components might originate from a radio transmitter device with the two bandpass filters (one filter comprised of resonators 16 and 15 and the other filter comprised of resonators 15 and 14) separating signals from the transmitter device into different frequency components that are coupled to different antennas for broadcast. Alternatively, a radio frequency signal on pad 19 might originate from a radio antenna device, such as is shown in FIG. 3, with the two bandpass filters separating received radio frequency signals into different frequency components that are coupled to different receivers that might be coupled to pads 18 and 20.

In addition to separating electrical signals according to frequency, the duplexer shown in FIG. 3 can be used to acid, or combine, different frequency signals at the first and second input-output pads (18 and 20) to the third input-output pad (19) as well. If different radio frequency signals from two different radio signal sources are impressed on the first and second input pads (18 and 20), and if these signals have first and second center frequencies corresponding to the center frequencies of the filters, the two filters will combine the two signals and pass them to the third input-output pad (19). In such an application, the radio frequency signals on the first anti second input-output pads (18 and 20) might originate from two different frequency radio transmitters the outputs of which are combined and appear together on pad 19 for subsequent broadcast on an antenna. Pad 19 might be coupled to such an antenna device. The two different radio frequency signals on pads 18 and 20 might also originate from two different antenna devices the signals from which are combined by the filter (10) operating as a duplexer and appear together on pad 19 to which one or more radio receiver devices might be coupled.

In most applications for a duplexer, if the third input-output pad (19) is coupled to a single antenna for a two-way radio communications device and if the first filter (comprised of the first and third resonators 16 and 15) has a first center frequency different from the center frequency of the second filter (comprised of the second and third resonators 14 and 15 and having a second center frequency) the three-hole block readily permits full-duplex communications.

If the third input-output pad is coupled to an antenna for a two-way, full-duplex, radio communications device having transmitter and receiver portions that operate simultaneously albeit at different frequencies in a full-duplex mode, (i.e. the receiver may be receiving signals at $f_1$ while the transmitter is transmitting signals at $f_2$), one filter section of the duplexer shown in FIG. 3 (the receiver filter) would permit the receiver section to receive only the $f_1$ signals from the antenna while suppressing from the receivers input, $f_2$ signals from the transmitter. The second filter section of the duplexer (the transmitter section) would permit only $f_2$ signals from the transmitter to be coupled to the antenna. Stated alternatively, if one filter section (comprised of resonators 16 and 15 for example) has a center frequency corresponding to The transmitter frequency of the communications device and if the other filter section (comprised of resonators 14 and 15) has a center frequency corresponding to the receiver frequency of the communications device, the receiver's filter section will prevent signals from the transmitter from reaching the receiver. The transmitter's filter section will prevent signals on the antenna that are outside the transmit band and which might mix with signals in the transmitter, possibly generating unwanted spurious signals from reaching the transmitter. The transmit filter also eliminates noise and other spurious signals from the transmitter output signal that might interfere with the receiver.

Those skilled in the art will of course recognize that the filter shown in FIG. 3 can be used to separate a source of signals at pad 19 into two different frequency components that would appear at pads 18 and 20. Such a source of signals might be a single antenna coupled to pad 19 for example. Such a source of signals on pad 19 might also include one or more transmitters signals from which are to be split to antennas coupled to pads 18 and 20.

The filter could also be used to combine two different frequency signals on pads 18 and 20 into one signal at pad 19. Such signals to be combined might originate from two transmitters (coupled to pads 18 and 20) to be coupled to a single antenna coupled to pad 19. Signals from pads 18 and 20 to be combined might also originate from two antennas coupled to pads 18 and 20 combined in the filter for a single radio device coupled to pad 19.

The filter shown in FIG. 3, when used as a duplexer, can be used in virtually any topology which will of course depend upon the application of the device. A source of electrical signals might be coupled to any one (or two) of the; three input-output pads (18, 19, or 20) with the other two (or one) pads being coupled to the destination for the signals. A destination for signals might also be coupled to any one (or two) of the input-output pads with a source of signals being coupled to the other two (or one) input-output pads.

Still other embodiments of the filter shown in the figures would contemplate adding multiple resonators (three or more;), to block structures having only two input output pads as well adding multiple resonators to blocks having three or more input-output pads wherein the third input-output lead is coupled to more than one of the plurality of resonators. If the surface area of the third input output pad (19) is increased such that it is relatively close to more than one resonator, the coupling between the third input-output pad (19) and the various resonators will affect the response of a filter or duplexer accordingly.

We claim:

1. A filter for passing desired frequency electrical signals comprising:

a filter body comprised of a block of dielectric material having a first predetermined physical length, substantially planar top and bottom surfaces and having a least one substantially planar side surface, said filter body having at least first and second holes extending through the top and bottom surfaces, said holes spatially disposed at a predetermined distance from one another, said block of dielectric material including on said substantially planar side surface and between said first and second holes, at least one slot formed thereon, said slot being substantially parallel to said holes, having a length dimension, and extending substantially between at least a first and second input-output pad for improved isolation between the first and the second input-output pads;

said first input-output pads comprised of an area of conductive material disposed on said planar side surface substantially surrounded by an uncoated area on said side surface;

said second input-output pad comprised of an area of conductive material disposed on said planar surface substantially surrounded by an uncoated area on said planar side surface;

said filter body and interior surfaces of said first and second holes being substantially covered with a conductive material with the exception of said top surface being entirely uncoated, said coated interior surfaces of said first and second holes and said coated filter body forming first and second shorted coaxial resonators respectively having first and second electrical lengths, said first and second input-output pads being capacitively coupled to said first and said second shorted coaxial resonators.

2. The filter of claim 1 where said filter body is comprised of a block of dielectric material having the shape of a parallelpiped.

3. The filter of claim 1 where said first and second holes have circular cross-sectional shapes.

4. The filter of claim 1 where said first and second holes have substantially parallel center axes.

5. The filter of claim 1 where said at least one slot extends completely between said top and bottom surfaces.

6. The filter of claim 1 including at least one additional hole, said at least one additional hole being positioned substantially between said first and second holes and extending through the top and bottom surfaces, interior surfaces of said block within said at least one additional hole being substantially covered with a conductive material which is electrically coupled to said conductive material covering said block of dielectric material at said bottom surface and forming a third shorted coaxial resonator.

7. The filter of claim 6 where said first input-output pad is substantially adjacent to said first hole and said second input-output pad is substantially adjacent to said second hole.

8. The filter of claim 6 further including at least a third input-output pad between said first and second input-output pads wherein said at least one slot comprised a first slot located between said first and third input-output pads, and a second slot located between said second and third input-output pads.

9. The filter of claim 8 where said third input-output pad is substantially adjacent said at least one additional hole, forming a third shorted coaxial resonator, said third input-output pad being, positioned at a predetermined location between said first and second input-output pads such that said first and third input-output pads substantially couple signals through said first and third resonators thereby forming a first filter portion, said second and third input-output pads coupling signals substantially through said second and third resonators forming a second filter portion, said first and second filter position having first and second center frequencies respectively.

10. The filter of claim 9 where said third input-output pad is coupled to a source of radio communications signals.

11. The filter of claim 9 where said third input-output pad is coupled to a source of radio communications signals comprised of at least first and second frequency signal components, and where said first and second input-output pads are coupled to first and second radio communications signal destinations.

12. The filter of claim 9 where said first and second input-output pads are coupled to first and second sources of radio communications signals and where said third input-output pad is coupled to a destination for radio communications signals.

13. The filter of claim 9 where said first center frequency is substantially equal to the center frequency of a radio communications device transmit frequency, said second center frequency is substantially equal to the center frequency of a radio communications device receive frequency and where said third input-output pad is coupled to a source of radio communications signals.

14. The filter of claim 1 including a plurality of additional holes, said plurality of additional holes being positioned substantially between said first and second holes and all extending through the top and bottom surfaces, spatially disposed at predetermined distances from each other and from said first and second holes, interior surfaces of said block within said plurality of additional holes being substantially covered with a conductive material electrically coupled to conductive material covering said block of material and forming a plurality of shorted coaxial resonators.

15. The filter of claim 1 where said first and second electrical lengths are odd-numbered multiples of one-quarter wavelengths of said desired frequency signals.

16. The filter of claim 1 where said first predetermined physical length of said block of dielectric material is substantially equal to an odd number of multiples of one-quarter the wavelength of said desired frequency signals.

17. A filter comprising:
a block of dielectric material having a first predetermined physical length, at least top and bottom substantially planar surfaces and at least one substantially planar side surface, said planar side surface also having a predetermined physical length and being substantially orthogonal to said top and said bottom surfaces, said block of dielectric material having at least first and second through holes, said through holes extending through the top and bottom surfaces;
a first input-output pad comprised of a substantially planar area of conductive material disposed on said planar side surface;
a second input-output pad comprised of a substantially planar area of conductive material disposed on said planar side surface;
a slot formed into said substantially planar side surface between said first and second input-output pads;
said block of dielectric material and interior surfaces of said first and second holes being covered with a substantially continuous layer of conductive material with the exception of: (i) areas surrounding said first and said second output pads; (ii) with the additional exception of said top surface being entirely uncoated; and (iii) with the further exception that at least part of the slot is unmetallized, said coated interior surfaces of said first and said second holes and said coated dielectric block forming first and second shorted coaxial resonators, wherein the slot increases isolation between the first and the second input-output pads.

18. The filter of claim 17 where said slot has a substantially rectangular cross-section.

19. The filter of claim 17 where said first and second shorted coaxial resonators includes first and second electrical lengths which are odd-numbered multiples of one-quarter wavelengths of said desired frequency signals.

20. The filter of claim 17 including at least one additional hole, said at least one additional hole being positioned substantially between said first and second holes and extending through the top and bottom surfaces, surfaces in the interior of said at least one additional hole being substantially covered with a conductive material electrically coupled to conductive material covering said block of material, at the bottom of said block and forming a third shorted coaxial resonator.

21. The filter of claim 20 where said first and second input-output pads are substantially adjacent to said first and second holes respectively.

22. The filter of claim 20 further including at least a third input-output pad between said first and second input-output pads located at a predetermined position whereby said slot is located between said first and third input-output pads and further including at least a second slot located between said second and third input-output pads.

23. The filter of claim 22 where said third input-output pad is substantially adjacent to said third shorted coaxial resonator and positioned at a predetermined location between said first and second input-output pads such that said first and third input-output pads substantially couple signals through said first and third resonators thereby forming a first filter portion, said second and third input-output pads coupling signals substantially through said second and third resonators forming a second filter portion, said first and second portions having first and second center frequencies respectively.

24. The filter of claim 22 where said third input-output pad is coupled to a source of radio communications signals comprised of at least first and second frequency signal components, and where said first and second input-output pads are coupled to first and second radio communications signal destinations.

25. The filter of claim 22 where said first and second input-output pads are coupled to first and second sources of radio communications signals and where said third input-output pad is coupled to a destination for radio communications signals.

26. The filter of claim 23 where said third input-output pad is coupled to a source of radio communications signals.

27. The filter of claim 23 where said first center frequency is substantially equal to the center frequency of a radio communications device transmit frequency, said second center frequency is substantially equal to the center frequency of a radio communications device receive frequency and where said third input-output pad is coupled to a source of radio communications signals.

28. The filter of claim 17 including a plurality of additional holes, said plurality of additional holes being positioned substantially between said first and second holes and all extending through the top and bottom surfaces, spatially disposed at predetermined distances from each other and from said first and second holes, interior surfaces of said block within said plurality of additional holes being substantially covered with a conductive material electrically coupled to conductive material covering said block of material and forming a plurality of shorted coaxial resonators.

29. A surface mountable duplexer for electrical signals comprising:
a block of dielectric material having a first predetermined physical length, substantially planar, top and bottom surfaces and at least one substantially planar side surface, said substantially planar side surface having a predetermined physical length substantially equal to said first predetermined physical length and said block of dielectric material having first, second, and third holes, extending through the top and bottom surfaces, spatially disposed at a predetermined distance from one another;
a first input-output pad comprised of an area of conductive material disposed on said planar side surface at a first distance from said first hole;
a second input-output pad comprised of an area of conductive material disposed on said planar side surface at said first distance from said second hole in the block of dielectric material;
a third input-output pad comprised of an area of conductive material disposed on said planar side surface at said first distance from said third hole in the block of dielectric material, said third input-output pad being located between said first and second input-output pads and substantially adjacent to said third hole;
a first slot formed into said substantially planar side surface between said first and third input-output pads;
a second slot formed in: to said substantially planar side surface between said second and third input-output pads;
said block of dielectric material and interior surfaces of said first and second holes being substantially covered with a conductive material with the exception of uncoated areas surrounding said first, second, and third input-output pads on said planar side surface and with the additional exception of said top surface being entirely uncoated, said coated interior surfaces of said holes and said coated dielectric block forming first, second, and third shorted coaxial resonators thereby forming first and second filters sharing said third input-output pad as a common input-output pad, said input-output pads being capacitively coupled to said shorted coaxial resonators, wherein each slot increases isolation between the input-output pads.

30. The duplexer of claim 29 where said input-output pads are areas of conductive material substantially adjacent to said top surface of said block.

31. The duplexer of claim 29 where said third input-output pad is coupled to a source of radio communications signals.

32. The filter of claim 1 where said at least one slot is filled with conductive material.

* * * * *